US008515725B2

(12) United States Patent (10) Patent No.: US 8,515,725 B2
Feldmann et al. (45) Date of Patent: Aug. 20, 2013

(54) CHARACTERIZATION OF NONLINEAR CELL MACRO MODEL FOR TIMING ANALYSIS

(75) Inventors: Peter Feldmann, New York, NY (US); Sampath Dechu, Bangalore (IN); Soroush Abbaspour, Ossining, NY (US); Ratan Singh, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/958,637

(22) Filed: Dec. 2, 2010

(65) Prior Publication Data

US 2012/0143582 A1 Jun. 7, 2012

(51) Int. Cl.
*G06F 17/50* (2006.01)
*G06G 7/48* (2006.01)

(52) U.S. Cl.
USPC .................................. 703/14; 703/4; 703/13

(58) Field of Classification Search
USPC ................................................ 703/14, 4, 13
See application file for complete search history.

(56) References Cited

U.S. PATENT DOCUMENTS 7,701,087 B2 * 4/2010 Eckroad et al. ................. 307/46
8,302,046 B1 * 10/2012 Keller et al. ................... 716/108

OTHER PUBLICATIONS

Peng Li, NPL, "A waveform Independent Gate Model for Accurate Timing Analysis", IEEE 2005.*
Chirayu Amin, NPL, "A multi-port Current Source Model for Multiple-Input Switching Effects in CMOS Library Cells", Jul. 2006.*
Roy Leventhal, NPL, "How to use the IBIS Model", May 8, 2010.*
Chandramouli Kashyap, NPL, "A nonlinear cell macromodel for digital applications", IEEE 2007.*
C. Kashyap, C. Amin, N. Menezes, E. Chiprout, "A Nonlinear Cell Macromodel for Digitical Applications", Proc. ICCAP, 2007, pp. 678-685.
C. Amin, C. Kashyap, N. Menezes, K. Killpack and E. Chiprout, "A multi-port Current Source Model for Multiple Input Switching Effects in CMOS Library Cells", Proc. DAC, pp. 247-252, Jul. 2006.
P. Li and E. Acar, "Waveform independent gate models for accurate timing analysis", Proc. ICCD, pp. 363-365, Oct. 2005.
I. Keller, K. Tseng, N. Verghese, "A robust cell-level cross talk delay change analysis", Proc. of ICCAD 2004, pp. 147-154.

(Continued)

*Primary Examiner* — Omar Fernandez Rivas
*Assistant Examiner* — Angel Calle
(74) *Attorney, Agent, or Firm* — Scully, Scott, Murphy & Presser, P.C.; H. Daniel Schnurmann

(57) ABSTRACT

A system, method and computer program product for modeling a semiconductor device structure. The system and method implemented includes performing a simulation of the circuit by applying at least one input waveform on a circuit input port, and loading an output port with at least one of output load; determining, at successive time steps of the circuit simulation, a voltage value Vi on the input port, a voltage value Vo on the output port, and a current values (ia) and (ib) on the respective input and output ports. Then there is computed from the respective current value for each successive time step of the simulation, at least one charge value (Qa(Vi, Vo)) and (Qb(Vi, Vo)), respectively, as a function of Vi and Vo voltage values; and generating a nonlinear charge source from the at least one charge value, the nonlinear charge source used in modeling a dynamic behavior of the cell. A voltage controlled charge source (VCCS) is thereby determined by capturing the natural digital circuit cell behavior.

25 Claims, 12 Drawing Sheets

(56) References Cited

OTHER PUBLICATIONS

B. Tutuianu, R. Baldick, and M.S. Johnstone, "Nolinear Driver Models for Timing and Noise Analysis", IEEE Trans. On CAD, vol. 23, No. 11, pp. 1510-1521, Nov. 2004.

A. Korshak, J. Lee, "An Effective Current Source Model for VDSM Delay Calculation", Proc. ISQED 1998, pp. 296-300.

D.E. Ward, R.W. Dutton, "A Charge-Oriented Model for MOS Transistor capacitances", IEEE Journal of Solid-Stat Circuits 1978, vol. 13, pp. 23-28.

J.F. Croix and D. F. Wong, "Blade and Razor: Cell an interconnect delay analysis using current-based models", Proc. of DAC 2003, pp. 386-389.

"CCS Timing White Paper", Composite Current Source, Synopsys, [online], http://www.synopsys.com/products/solutions/galaxy/ccs/cc_source.html, 2005.

"Delay Calculation meets the nanometer era", Cadence Technical Paper, [online], http://www.cadence.com/products/digital_ic/tech_info.aspx, 2005.

J. Qian, S. S Pullela and L. Pillage, "Modeling the effective capacitance for the RC interconnect of CMOS gates", IEEE Trans. on CAD, vol. 13, No. 12, pp. 1526-1535, Dec. 1994.

* cited by examiner

CHARACTERIZATION OF NONLINEAR CELL MACRO MODEL FOR TIMING ANALYSIS

The present technology relates to methods and systems for modeling integrated circuit layouts, generally, and particularly, a system and method for modeling a digital cell and interconnects, that embeds techniques for characterizing a voltage controlled charge source (VCCS) signal to represent the dynamic behavior of the digital cell.

BACKGROUND

The success of any semiconductor industry crucially depends upon the number of correct chips it produces (yield) within a given time window. Yield analysis has thus become a major issue for the progress of any electronic industry. For current nanometer-scale technologies, yield remains very low during the initial stages of manufacturing. This is mainly because the manufacturing and lithographic techniques still remain at 193 nm whereas the technology nodes have been driven below 60 nm. The process-design interactions lead to design rule violations that further result in a class of faults that are termed Systematic Defects, i.e., a class of faults which occur because of various design rule violations which are caused by process-design interactions. Such process-design interactions mainly occur because of the limitations of the manufacturing techniques in the current nanometer era.

With technology nodes now being driven much below 65 nm, timing characterization has become an extremely challenging task for the Electronic Design Automation (EDA) industries. Techniques like non-linear delay modeling (NLDMs) have been conventionally used for modeling the delay of the digital gates.

For a given technology model and for a given process corner, the conventional NLDM characterization characterizes the delay of the gate in a look up table which stores the delay of the gate for a particular input voltage slew and output load capacitance. The delay of the gate corresponding to different input slews (rising/falling) are computed with different output loading capacitances (Ceff) using SPICE and stored in a 2 dimensional lookup table. See, for example, a reference to J. Qian, S. Pullela, and L. Pillage entitled "Modeling the effective capacitance for the RC interconnect of CMOS gates," IEEE Trans. on CAD, vol. 13, no. 12, pp. 1526-1535, December 1994. During the timing analysis, whenever a particular gate is encountered, first a Ceff is computed from the corresponding output loading. Both the Ceff value and the input slew at the gate are used to look up the delay value from NLDM look-up table using non-linear approximations.

The need for accurate modeling of cell has become acute at advanced technology nodes. Several effects such as Multiple Input Switching, Nonlinear Pin Capacitance, etc., which were considered as second order terms at earlier technology nodes are showing major impact at advanced technology nodes. Owing to the highly resistive interconnect and noisy waveforms, table lookup techniques like NDLM that have been conventionally used to predict the gate delay for a given input slew and output loading capacitance (Ceff) are no longer able to estimate accurate delays thereby resulting in high errors during the timing analysis of digital designs.

The emergence of Current Source models such as described in a reference to P. Li and E. Acar entitled "Waveform independent gate models for accurate timing analysis", Proc ICCD, pp. 363-365, October 2005, provides an efficient solution to this problem by modeling the digital cells as a voltage controlled DC-current source along with either various nonlinear parasitic capacitances or voltage controlled charge sources (VCCS) embedded in to the model.

The characterization of VCCS is highly important for accurately modeling of the nonlinear cell behavior. However, very little attention has been paid towards characterization of VCCS in the literature. In known techniques such as described in a reference to C. Amin, C. Kashyap, N. Menezes, K. Killpack and E. Chiprout entitled "A multi-port current source model for multiple-input switching effects in CMOS library cells," Proc. of DAC, pp. 247-252, July 2006, the output and input ports of the cell are either forced to a constant voltage or fast ramp voltages (i.e., quickly rising/falling linear voltage waveforms) are applied at them.

For instance, existing current source models (BLADE and RAZOR) proposed in the reference to J. F. Croix and D. F. Wong entitled "Blade and Razor: Cell an interconnect delay analysis using current-based models," Proc. of DAC 2003, pp. 386-389, model any digital CMOS gate as a voltage controlled current source with a linear output capacitance. The voltage controlled current source captures the DC characteristics of the gate whereas the linear output capacitance captures the dynamic behavior of the gate for different slews. The model proposed in the J. F. Croix et al. reference itself is in a very nascent form and the modeling itself is very inaccurate as it assumes a linear output capacitance at the output of the cell. Also, this linear capacitance is characterized using SPICE by providing ramps at the input of the cell and measuring the output current. This characterization method is quite inaccurate.

FIG. 1 depicts the BLADE current model 10 for modeling delay of CMOS digital cells. These models characterize a DC voltage controlled current source 12 along with the linear output capacitance using SPICE characterized on a "[Vi×Vo] space" which denotes a set of all the possible voltage input and voltage output [Vi Vo] combinations. In this model, input capacitances are neglected, output capacitance 15 is linear and the non-linear nature of capacitances is neglected. The characterization for such current-source models is actually independent of the output loading and hence no Ceff modeling is required in such a scenario. Hence, such kind of modeling actually assists in obtaining load independent device characterization. That is, the model parameters which are characterized are independent of output loading and depend only upon the voltage at input and output pins of the cell rather than the 'characterization procedure' itself which does depend upon the output capacitances which are chosen for the characterization purpose and helps generate an output waveform for a given arbitrary waveform (nonlinear/noisy) at the gate input for a given output loading (resistive/capacitive). Since the complete output waveform is generated for a given input waveform, the inaccuracy in NLDM due to the interpolation and due to handling of noisy/nonlinear waveforms is completely eliminated from such a model.

FIG. 2 depicts a more generic model for CSMs by modeling non-linear capacitance at the driving gate's output using a voltage controlled charge source (VCCS) such as described in the above-identified reference to P. Li and E. Acar. As shown in FIG. 2 this model consists of a two stage waveform independent gate model 20 (WiM) that introduces a $2^{nd}$ order linear RC stage 22 at the input which provides robustness for modeling complex multi stage gates. In the current source model 20 shown in FIG. 2, the VCCS is characterized by holding the output at constant voltage threshold and providing a ramp at the input.

FIG. 3 depicts a multiport CSM model for delay and noise characterization such as described in above-mentioned reference to C. Amin, C. Kashyap, et al. As shown in FIG. 3, the multiport CSM model 30 targets the problem of multiple input switching (MIS) by modeling various input/output and miller capacitances at any input/output node in the form of voltage controlled charge source (VCCS). The non-linear DC current source at each port captures the DC behavior of the cell and various nonlinear voltage controlled charge source at each port represent the dynamic behavior of the cell output. The VCCS of charge value 'Qi' at each port 'Pi', i=1, ..., n2, n−1, n, depends on the instantaneous value of voltage 'Vi' at each port 'i' as follows:

$Qi=F(V1,V2,\ldots,Vn)$

Likewise, in view of FIG. 3, at any port Pi, $IR,pi=Gi(V1,V2,\ldots,Vn)$ $Qc,pi=Fi(V1,V2,\ldots,Vn)$ and the instantaneous value of current at any port 'k' is:

$\Sigma_{i=1}^{n}((\partial Q_{c,pk}/\partial V_{i})\times(\partial V_{i}/\partial t))$ $i_{pk}=i_{R,pk}+\Sigma_{i=1}^{n}((\partial Q_{c,pk}/\partial V_{i})\times(\partial V_{i}/\partial t))$ The modeling of charge at each port in such a way helps capture the effects of both—the nonlinear output capacitance and the nonlinear miller capacitances linked at each port. The charge source Qc,pi (at each port P1, ... Pn) is characterized by forcing a quick ramp at each port i and dynamically measuring the corresponding current entering at each port at specific time steps. In this technique, there are provided quick ramps at all the ports—whether input or output—and hence they have forced the output with a quick ramp waveform. Thus, for example, to characterize the charges at each port corresponding to a voltage combination of (V1, V2, ..., Vn) at ports (1,2, ..., n), a quick ramp from '0' to a voltage value 'V1' is applied at port 1, a quick ramp from '0' to a voltage value 'V2' is applied at port 2 and so on and the currents entering each port are measured at specific instants of time. The integral of the current entering the charge source (at each port) over a large period of time provides the value of charge Q(V1, V2, ..., Vn).

The main drawback of this technique is that it doesn't include the modeling of internal nodes of the cell in to account. For complex multistage cells, the charges and currents at different ports of the cell not only depend upon the voltages at different ports, but also on the voltages of internal nodes.

Also, this technique lacks accuracy from the point of view of characterizing the charge sources at each port. Firstly, to characterize the charges at each port at voltage combinations (V1, V2, ... Vn), the voltage at each port 'i' is forced to go from '0' to a value 'Vi' which is not a natural behavior of the cell; in real circuits, outputs are never forced to take any values.

It would be highly desirable to provide a novel technique to characterize VCCS representing dynamic behavior of a cell in the modeling of digital cells.

Moreover, it would be highly desirable to provide a method and system for more accurately modeling semiconductor device performance and provide an integrated approach for various cell analyses like timing, cell delay, noise, and power where a VCCS is used to represent the dynamic behavior of the digital cell.

SUMMARY

There is provided a system and method that addresses the above and other issues by providing a computationally efficient and accurate technique for modeling dynamic behavior of digital cells.

In particular, there is provided a method for characterizing the voltage controlled charge sources at each cell input and output port that implements applying different ramp waveforms at the cell input and observing output for different load capacitances. This technique does not include forcing the output ports of the cell with any particular voltage/ramps. Hence, the charge values obtained in the region of operation are much more accurate.

In one aspect, to incorporate the effects of noisy waveforms, charge values of VCCS are extrapolated on the entire $[V_i \times V_o]$ space using mathematical techniques.

More particularly, there is provided a system, method and computer program product for modeling a semiconductor device structure. The method implemented includes performing a simulation of the circuit by applying at least one input waveform on any particular circuit input port ('A'), and loading any particular output port ('B') with at least one output load; determining, at successive time steps of the circuit simulation, a voltage value Vi on the input port, a voltage value Vo on the output port, and the current values (ia) and (ib) on the input and output ports 'A' and 'B' respectively. Then, there is computed, from the current values (ia) and (ib) for each successive time step of the simulation, at least one charge value for a charge source (Qa(Vi, Vo)) at the input port 'A' and a charge source value for a charge source (Qb(Vi, Vo)) at the output port 'B' respectively as a function of Vi and Vo voltage values; and generating nonlinear charge sources from the at least one charge value, the nonlinear charge source used in modeling a dynamic behavior of the cell.

In accordance with a further aspect, there is provided a system for modeling a semiconductor transistor device structure. The system comprises: a memory; and, a processor unit in communication with the memory, for performing a method comprising: performing a simulation of the circuit by applying at least one input voltage waveform on a circuit input port, and loading an output port with at least one of output load; determining, at successive time steps of the circuit simulation, a voltage value Vi on the input port, a voltage value Vo on the output port, and a current value (ia) and (ib) on input and output ports 'A' and 'B' respectively; computing, from the current value, for each successive time step of the simulation, at least one charge value for a charge source (Qa(Vi, Vo)) at the input port 'A' and a charge value for a charge source (Qb(Vi, Vo)) at the output port 'B' as a function of Vi and Vo voltage values; and, generating a nonlinear charge source from the at least one charge value, the nonlinear charge source used in modeling a dynamic behavior of the cell.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages will become apparent to one skilled in the art, in view of the following detailed description taken in combination with the attached drawings, in which.

DETAILED DESCRIPTION

An accurate characterization of VCCS for the generation of nonlinear cell macros for digital designs is provided. The characterization technique is more accurate in the sense that the voltages at the output of the cell are not forced and rather, the charges generated by the real behavior of the cell are measured as in actual circuits. That is, for the characterization in the proposed technique, various input slews are given to the any particular input port 'A' of the cell at a specific load capacitance at any particular output port 'B' in the simulator program (e.g., SPICE) and the values of the input voltage, output voltage and output (and/or input) charges are stored at fixed time steps, e.g., on the order of about ~1.0 ps intervals. This is then repeated for different output capacitances loaded at the cell and finally the charge values for the input charge source (Qa(Vi, Vo)) and output charge source (Qb(Vi, Vo)) are obtained for different input and output voltage combinations (Vi–Vo) achieved during the characterization.

In one aspect, the charge values obtained for the input charge source (Qa(Vi, Vo)) (at input port 'A') and output charge source (Qb(Vi, Vo)) (at output port 'B'), which are obtained for a specific Vi–Vo region, are then individually smoothened and interpolated using a Gaussian filtering technique on specific Vi–Vo grid points as implemented in various Current Source Model techniques. To incorporate the effects of noisy waveforms, (Qa(Vi, Vo)) and (Qb(Vi, Vo)) are also individually extrapolated on the entire Vi–Vo grid using well known mathematical techniques for extrapolation or using the other approximate methods for characterizing 'Q'. The resultant smoothened and extrapolated charge sources are then used to model the dynamic behavior of the cell along with the non-linear DC current source and experimented with different kinds of waveforms including rising and falling ramps, noisy waveforms and etc.

Figure 1:
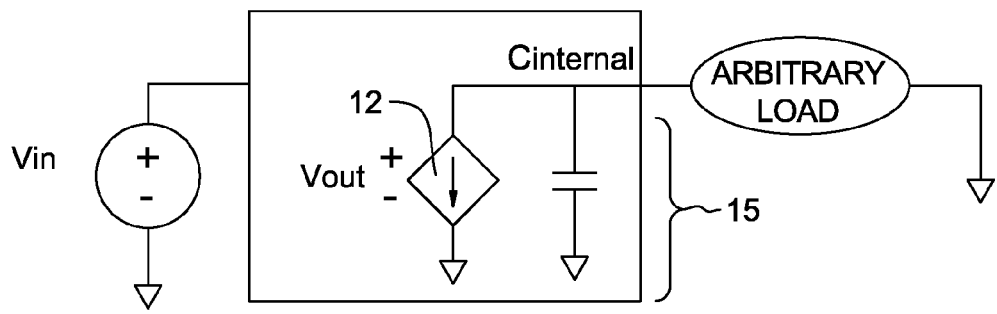
FIG. 1 illustrates an example prior art BLADE current-source model.
Figure 2:
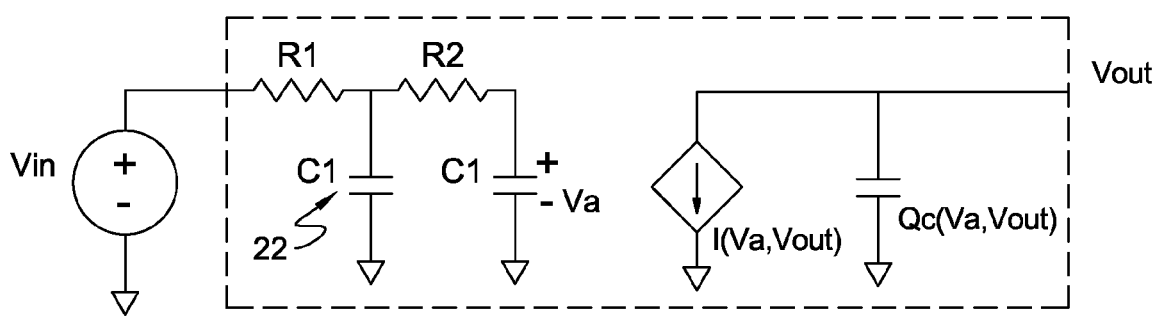
FIG. 2 illustrates an example prior art current source model that models non-linear capacitance at the driving gate's output using a voltage controlled charge source (VCCS)
Figure 3:
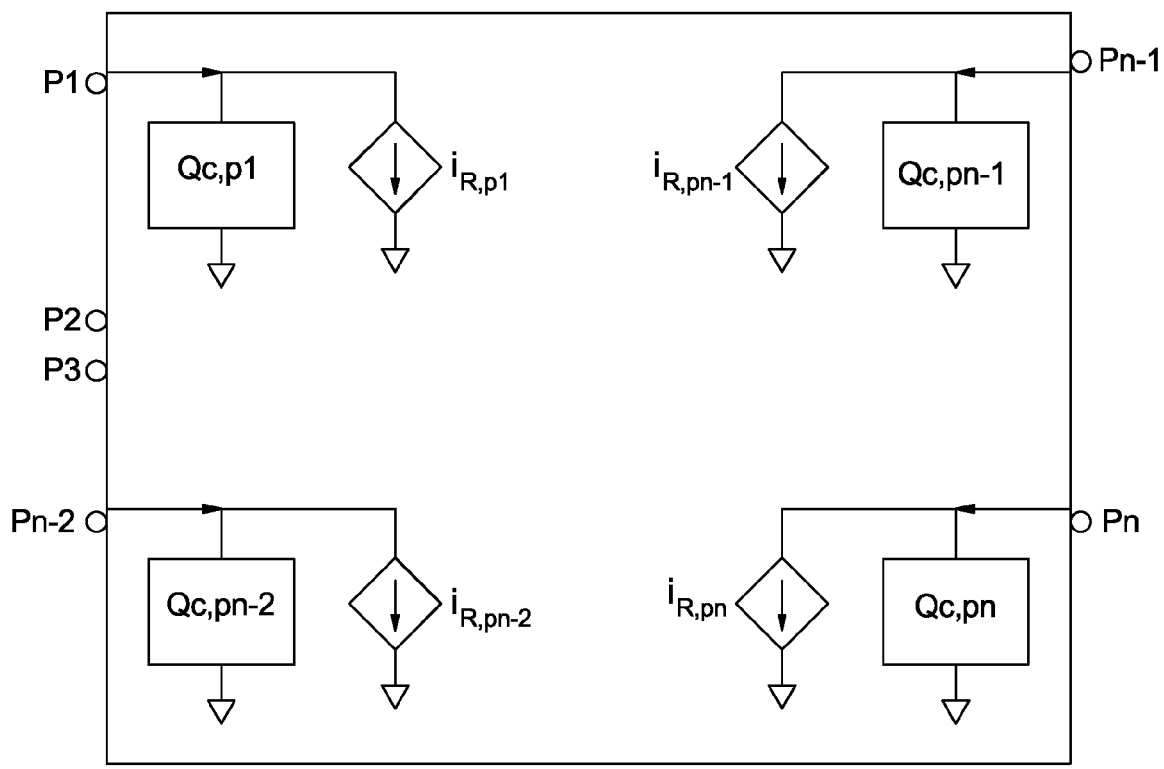
FIG. 3 depicts a Multi Port Current Source Model (MCSM) according to prior art current source model.
Figure 4:
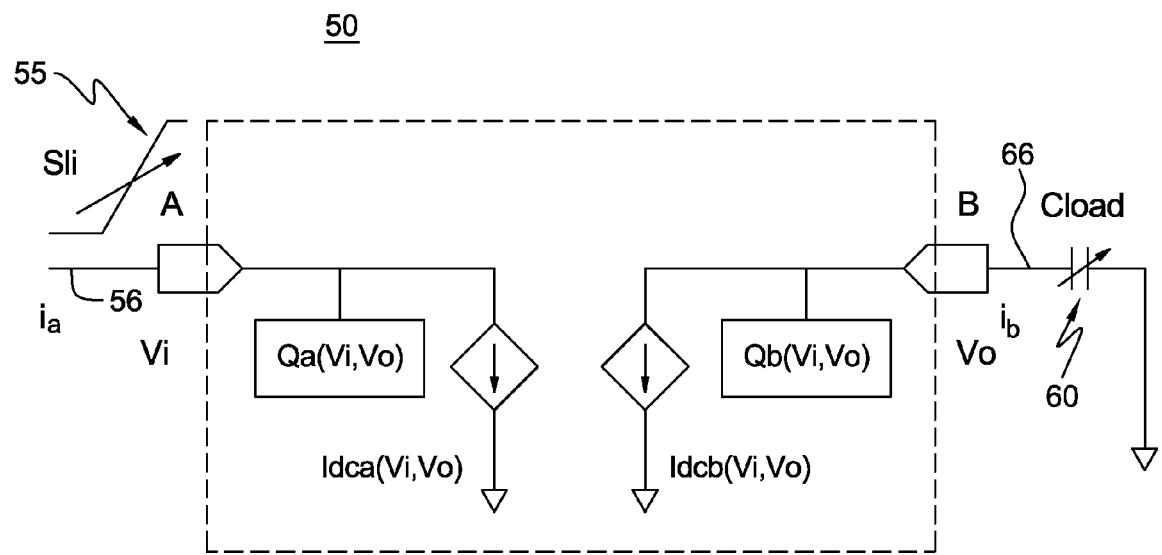
FIG. 4 depicts a model for characterizing VCCS for a digital cell in one embodiment.

FIG. 4 depicts an example VCCS characterization methodology for a digital cell 50. For purposes of description, the model is directed to an SIS (Single-Input-Switching) device. In one aspect, FIG. 4 characterizes an input-output path A-B of a standard digital cell 50 for the model. In the actual region of operation of the cell 50, various (input voltage) slews, Sli 55, are applied at the input of the cell. In one embodiment, input voltage slew rates range from between 5 ps and 120 ps used for 45 nm technology nodes, and the output loading capacitance, Cload 60, is varied. Input and output currents represented by respective currents $i_a$ 56 and $i_b$ 66 are measured, e.g., in SPICE, at specific time steps, e.g., ~1.0 ps, for each combination of 'Sli' and 'Cload' values. For a particular combination of 'Sli' and 'Cload', the charge values (Qa(Vi, Vo)) and (Qb(Vi, Vo)) (voltage controlled charge source) at particular input and output ports 'A' and 'B' respectively, at any instant of time, are governed according to equations 1) and 2) as follows:

$$Qb(Vi,Vo)=\int ib*dt-\int Idcb(Vi,Vo)*dt \qquad 1)$$

$$Qa(Vi,Vo)=\int ia*dt-\int Idca(Vi,Vo)*dt \qquad 2)$$

where Idcb(Vi, Vo) represents at least one voltage-dependent DC current source (Idca(Vi, Vo)) at any particular input port 'A' and Idcb(Vi, Vo) represents at least one voltage-dependent DC current source or at any particular output port 'B' of the circuit. The charge values 'Qb' and 'Qa' is then computed dynamically at each time step for every 'Sli' and 'Cload' combination and hence computed for entire permissible [Vi× Vo]|cell space. Separate charge values may be computed for the cases when rising and falling inputs are given to the cells.

Figure 5:
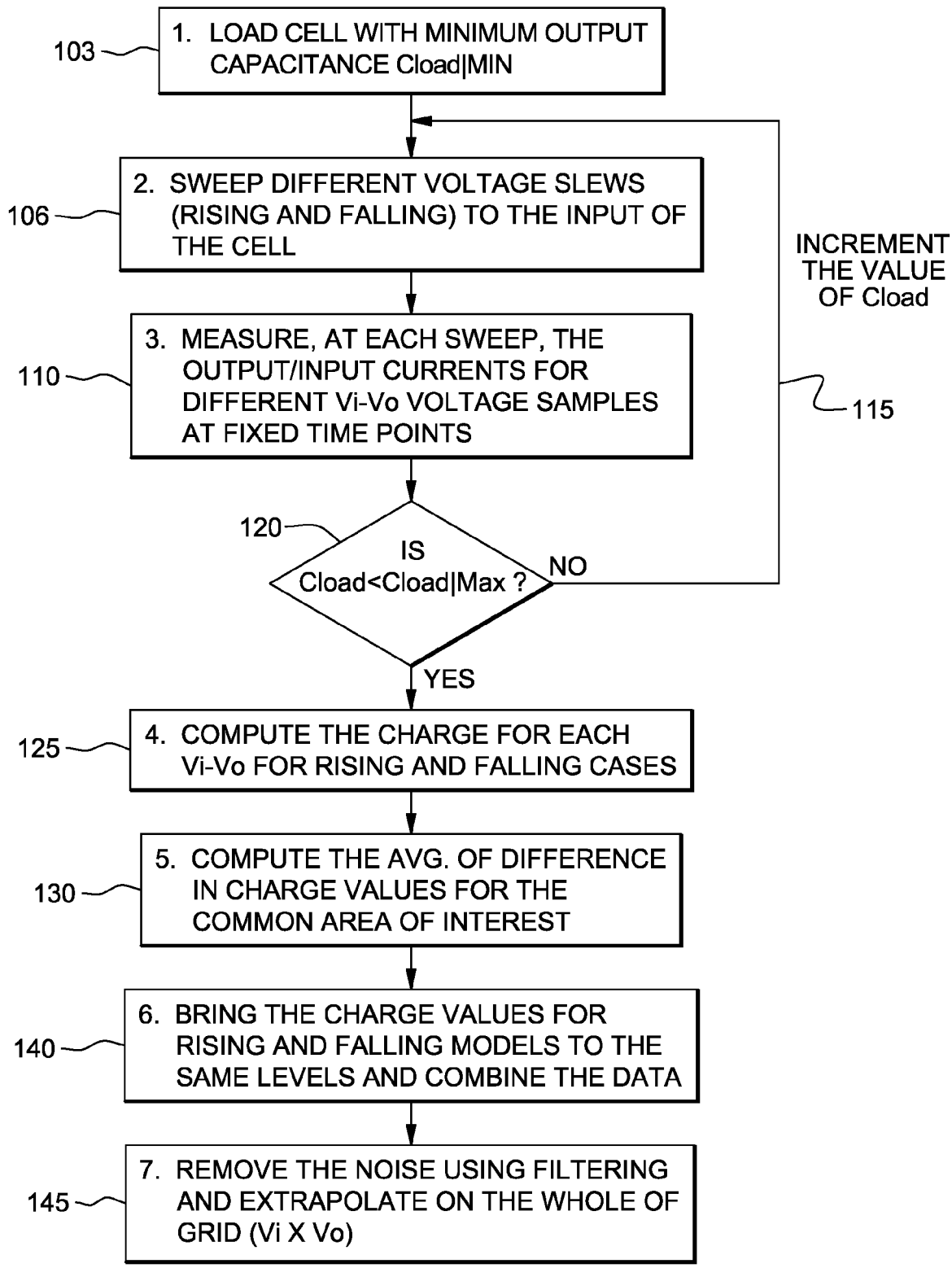
FIG. 5 is a flow chart depicting the overall charge characterization methodology 100 for any digital cell according to one embodiment.

FIG. 5 depicts the charge characterization methodology 100 according to one aspect. The charge characterization methodology 100 in FIG. 5 represents the overall methodology used for the charge (output/input) of the VCCS for any digital cell for use in CSMs. Firstly, at 103, the cell is loaded with the minimum value of output loading capacitance ('Cload|min' for the particular technology). Then, at 106, different rising and falling input slews are then applied to this cell and, at 110, the input and output current monitored for each Vi–Vo combination of waveforms at fixed time points, e.g., about 1 ps intervals or similar fixed time step which is generally a very small value compared to the slew rate provided at the input. The output loading capacitance of the cell for the next iteration of the algorithm is then incremented by a very small value at 115, and steps 103, 106 and 110 are repeated. This process is continued until the value of maximum output capacitance ('Cload|max') is reached, i.e., Cload meets or exceeds Cload_max, for a particular technology model as indicated at 120. That is, a determination is made at step 120 as to whether the current Cload value exceeds the Cload_max value and if it does not, then the process returns to step 106 with the incremented Cload value; otherwise the process proceeds to step 125. As indicated at 125, the input and output currents stored in the above steps are used to calculate charge (at output/input) from the equation 1. That is, the charge for each Vi–Vo combination is computed (according to equation 1) for each rising and falling slew inputs.

In one aspect, for DC Current Characterization, the cell input and output are connected to a respective DC source voltage and the DC sources are swept within the operating range to measure DC currents flowing through the input and output.

After the charge characterization steps, to merge the rise and fall data, the average of the difference of the charge values is computed in the common region of interest at 130 and this difference is then used to level the charge values for rise and fall models at 140. The merged charge data is then filtered and extrapolated on the entire user defined Grid (e.g., 38×38) as described herein above, at 145. The charge model is then used along with the pre-characterized DC current source to model the SIS behavior of the cell.

Figure 6:
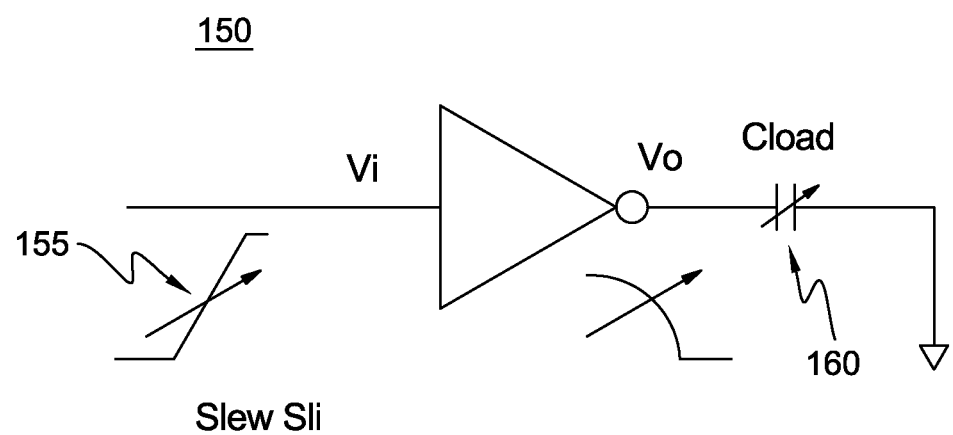
FIG. 6 illustrates a model for characterizing charge for an example inverter cell 150 modeled in accordance with one embodiment.

The charge characterization methodology for an example inverter cell 150 is now described with respect to FIG. 6. In one aspect of the methodology, there is considered the actual region of operation of the cell rather than considering the entire space generated by all the input-output voltage (Vi–Vo) combinations as now described with respect to FIG. 6 which depicts an example inverter cell whose dynamic behavior is to be modeled.

As shown in FIG. 6, the inverter 150 loaded with an output capacitance 'Cload' 160 and provided with a rising input ramp of slew 'Sli' 155. For this arrangement, by sampling the voltage waveforms at input and output of the inverter at fixed time points, a number of combinations of [Vi, Vo] is obtained for a particular slew 'Sli' and output loading capacitance 'Cload'. Denoting the set of all the possible [Vi Vo] combinations as [Vi×Vo] space, by varying the slew 'Sli' 155 from its minimum to maximum range for every possible output load capacitance 160, then all the permissible [Vi, Vo] combinations would be achieved for the inverter shown in FIG. 6. The entire collection of all such permissible [Vi Vo] combinations obtained for the example inverter model (when saturated rising ramps are provided at the input) is referred to as the permissible [Vi×Vo]|inv|rising space for the inverter.

Figure 7A:
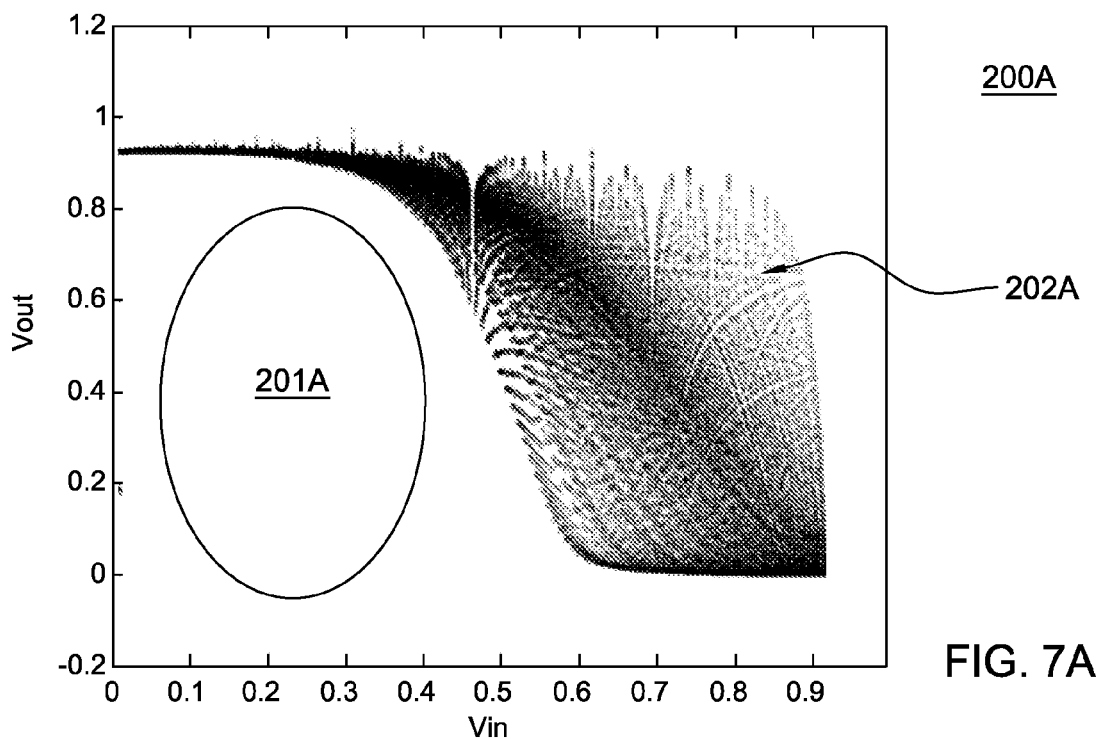
FIG. 7A depicts the permissible [Vi×Vo]|inv|falling space for the case of VCCS modeling of the example inverter cell of FIG. 6; and, FIG. 7B depicts the permissible [Vi×Vo] |inv|rising space for the case of VCCS modeling of the example inverter cell of FIG. 6.

FIG. 7A shows the permissible [Vi×Vo]|inv|rising space 200A shown plotted as a graph having a Vin (X-axis) and Vout (Y-axis)) obtained for the inverter cell 150 of FIG. 6, for the case when rising input ramps were given at different output loading capacitances. As shown in the plot 200A, nearly half of the part of the entire [Vi×Vo] region is occupied whereas the other half part of the space is never reached. In all the real circuits built using this inverter, the region of operation of inverter almost always remains in its permissible [Vi×Vo]|inv|rising space. Though, in the cases of noisy input/output waveforms, the [Vi×Vo]|inv|rising space might expand/compress a little. Thus, there is modeled the nonlinear behavior of the cell most accurately in this permissible [Vi×Vo]|inv|rising as this is the dominating region of the entire [Vi Vo] space where the cell actually operates. To accommodate the noisy waveforms, the model may be extrapolated to also incorporate the entire [Vi×Vo] space.

Figure 7B:
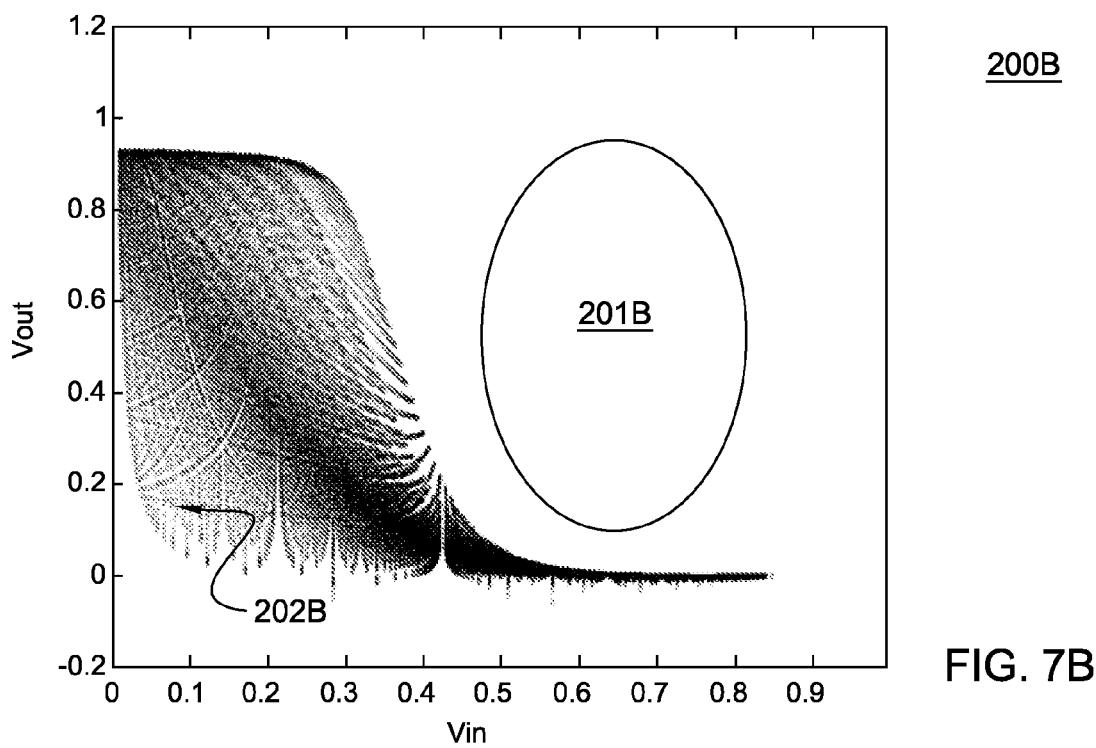

FIG. 7B shows the permissible [Vi×Vo]|inv|(falling space 200B shown plotted in graph of Vin (X-axis) and Vout (Y-axis)) obtained for the inverter cell 150 of FIG. 6, for the case when falling inputs ramps are provided to the inverter. As shown in FIG. 7A, characterizing rising voltage input slew edge and FIG. 7B characterizing falling voltage input slew, the respective [Vi×Vo]|inv|rising and [Vi×Vo]|inv|falling plot have much uncommon region 201A, 201B, respectively. That is, for the case when rising input ramps are given to the inverter (FIG. 7A), for any given output load capacitance 'Cload', for all the input slews applied, the permissible region starts to expand from the point (0,1) and eventually reaches (1,0). For fast rising ramps (e.g., for slew rates varying between 5 ps-20 ps), input quickly rises from '0' to '1' whereas the output slowly falls from '1' to '0' Hence, Vi>Vo for most of the time for this example and hence many points are indicated in a region 202A (to the right side of Vi=Vo) in FIG. 7B. For slow rising ramps, many points are mainly concentrated around the DC operating region of the inverter. A similar observations are obtained for the case of falling input ramps in FIG. 7B. For the case of falling input ramps, for any given output load capacitance 'Cload', for all the input slews applied, the permissible region starts to expand from the point (1,0) and eventually reaches (0,1). For the fast ramps as inputs, input quickly falls from '1' to '0' whereas the output slowly rises from '0' to '1'. Hence many points are indicated in a region 202B (to the left side of Vi=Vo) found in the region Vi<Vo in FIG. 7B.

Figure 8A:
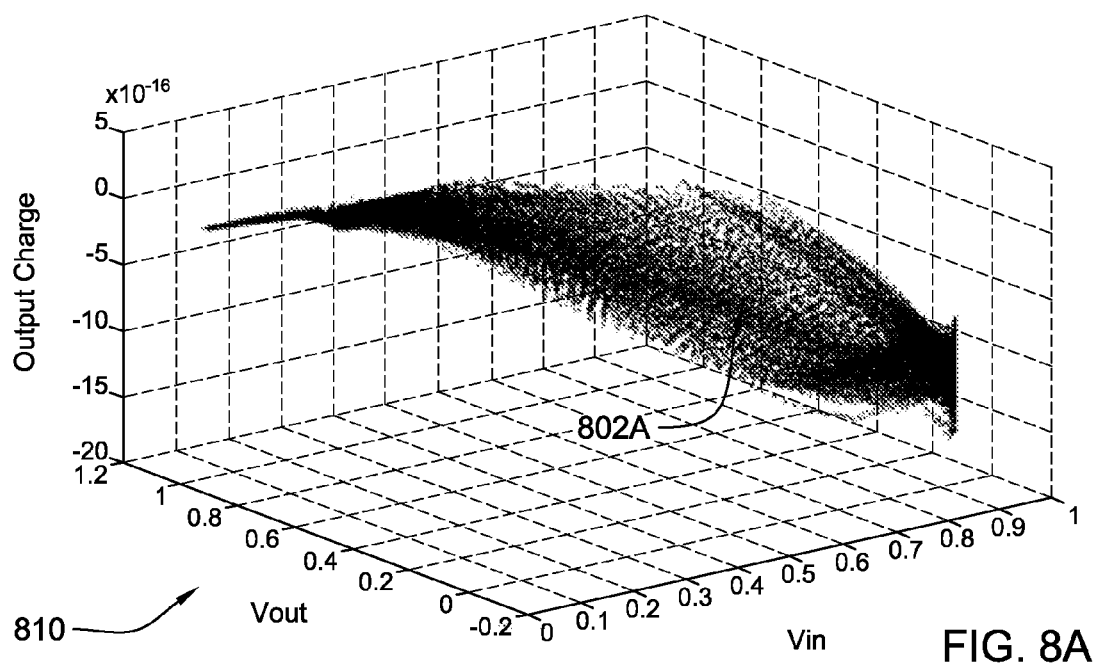
FIG. 8A depicts the computed output charge calculated for rising input ramps case for the example inverter cell of FIG. 6; and, FIG. 8B depicts the computed output charge calculated for falling input ramps case for the example inverter cell.
Figure 8B:
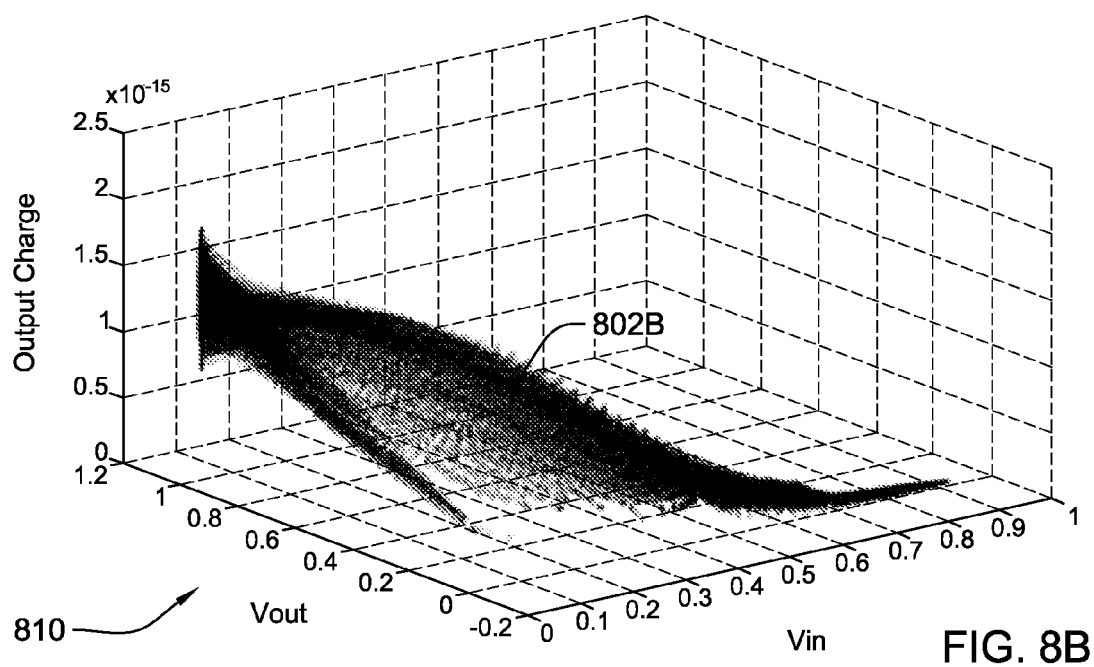

FIGS. 8A and 8B show the respective distribution of charges 802A, 802B obtained for the [Vi×Vo]|inv|rising and [Vi×Vo]|inv|falling cases respectively, in the example modeling of inverter cell 150 of FIG. 6. For both the cases, there is a little noise encountered in the charge data for any particular [Vi Vo] pair as the value of charge in VCCS depends upon the instantaneous value of voltages at each port. Thus, the modeling depicted includes a result of filtering out, e.g., using a Gaussian filtering technique, the charge values at user defined grid points, e.g., on Grid(Vi×Vo) 810 in which charge values are plotted in FIGS. 8A, 8B, each Grid(Vi×Vo) of FIG. 8A, 8B depicting a plot of Vi, Vo and corresponding charge Q values. The user defined points correspond to areas to be filtered out where there exists perceived noise specific to charge values computed. In this aspect, a mathematical Guassian Filter technique can be used.

In a further aspect, to incorporate the effects of noisy waveforms, the curves are extrapolated in both the cases. That is, as the charge characterization provides charge values for specific Vi and Vo only (i.e., not for all Vi, Vo co-ordinates), these characterized charge values can be used and an extrapolation performed to calculate the charge at other points of Vi and Vo (in Vi×Vo grid), e.g., using a linear extrapolation method.

Figure 9A:
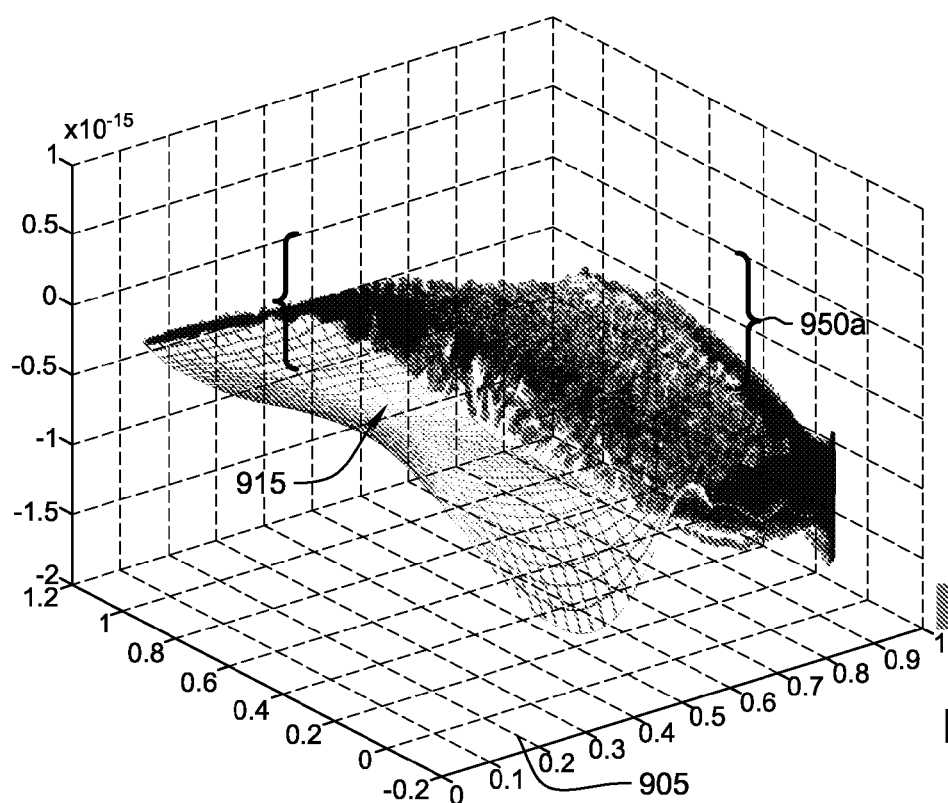
FIGS. 9A, 9B the resulting smoothened and extrapolated charge distributions on a Grid[Vi×Vo] for the [Vi×Vo] |inv|rising and [Vi×Vo]|inv|falling cases respectively, for the example inverter cell.
Figure 9B:
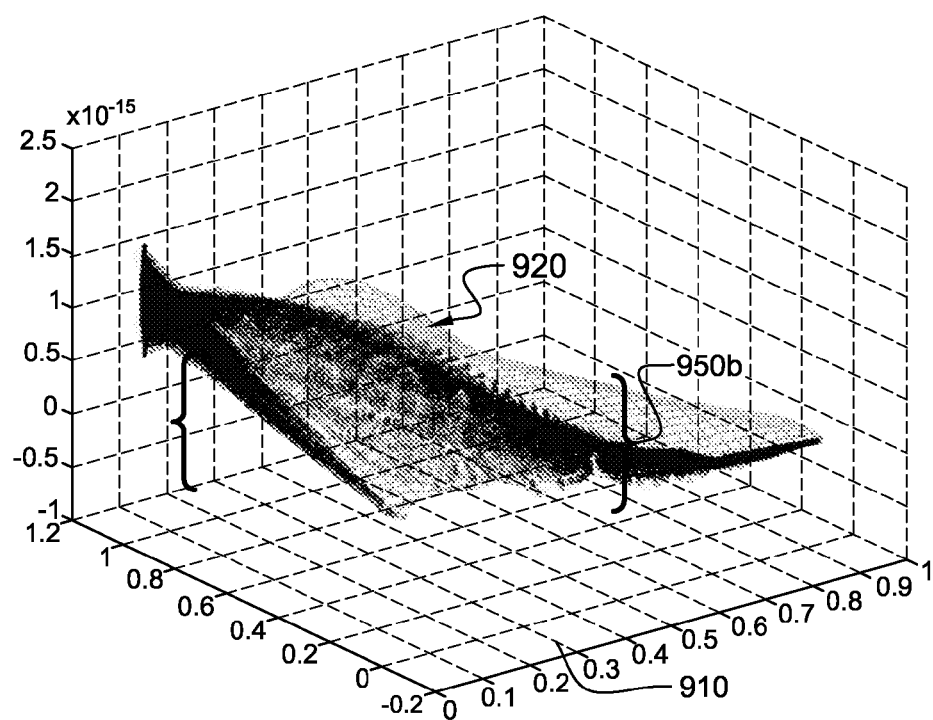

FIGS. 9A, 9B the resulting smoothened and extrapolated charge distributions 915, 920 on a respective Grid[Vi×Vo] 905 for the [Vi×Vo]|inv|rising and Grid[Vi×Vo] 910 for the [Vi×Vo]|inv|falling cases respectively, for the example inverter cell described. In each of FIGS. 9A, 9B there is shown a respective "common" area 950 of [Vi×Vo]|inv|rising and [Vi×Vo]|inv|falling, in which the charge values are different because of the difference in the way charges were characterized for the rising and falling input case. For example, inverter cell case of rising input ramps given to the inverter, the grid points corresponding to 'Vi'=0 and 'Vo'=1 have the output charge value of '0', whereas, in the case of falling input ramps given to the inverter, the grid points corresponding to 'Vi'=1 and 'Vo'=0 have the output charge value of '0'. As shown in FIG. 9A, the charge values 915 obtained for [Vi×Vo]|inv|rising space are <0 whereas, in FIG. 9B, the charge values 920 obtained for the [Vi×Vo]|inv|falling space are >0. A common area indicates the (Vi,Vo) coordinates where the charge values exist both for rising and falling waveforms as shown as approximated common area 950a of FIG. 9A and approximated overlap region 950b of FIG. 9B. It is understood that, in certain cases where there are multiple transistor stages, there may not be a common area at all (e.g., a buffer device).

Figure 9C:
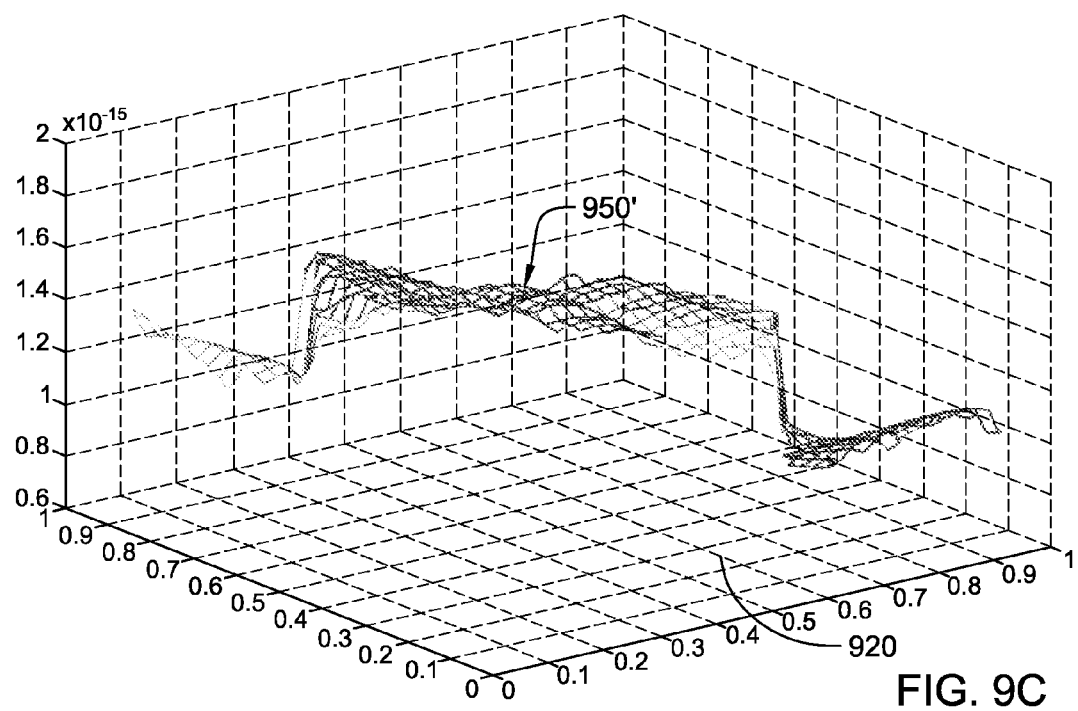
FIG. 9C is a plot depicting a difference between rising and falling charge in the common region identified.

In both FIGS. 9A, 9B, the common areas 950a,b are determined by finding those Vi,Vo coordinates where both rising and falling charge values exist. A resulting representation of the common area is shown as graph 950' plotted on Grid[Vi× Vo] 920 in FIG. 9C that may be generated for use in subsequent analyses. For example, in one embodiment, the common area 950' is generated as follows: Taking charge values from rising and falling for these common (Vi,Vo) coordinates and finding the difference between them (as showed in FIG. 9C). In FIG. 9C the formed difference graph 950' is flat, so this difference is taken and either subtracted or added to either rising or falling graph in FIG. 9A, 9B to bring them to a common level. In one embodiment, the average of all the values on this curve is taken and is subtracted from or added to bring them to the same level.

The curve 950' in FIG. 9C shows the difference between the charge values for the rising and falling cases on the grid points of Grid(Vi×Vo), e.g., Grid(38×38), in the common area of [Vi×Vo]|inv|rising and [Vi×Vo]|inv|falling spaces. This difference remains almost constant in the common region (common points between [Vi×Vo]|inv|rising and [Vi×Vo]|inv|falling). Also, from FIGS. 8A, 8B, the output charge values for the case of rising input ramps for inverter is <0 and whereas for the case of falling input ramps it is >0. Hence, the values of the difference of the output charge values for the cases lies in the same range as the values of the output charge for the two cases itself.

As the curve for the difference in the output charge values remains mainly flat (leveled) in the common regions of [Vi× Vo]|inv|rising and [Vi×Vo]|inv|falling spaces, the two models may be combined using a mathematical technique. That is, in one embodiment, the charge values of the rising and falling cases are just brought together for the entire [Vi×Vo] space. Alternately, an average of the difference of the output charge values for the rising and falling models in the common area of interest in the common area of interest in [Vi×Vo] space can be identified and then this difference used to bring the output charge data for the rising input ramps case in the same level as that of falling input ramps case.

Figure 9D:
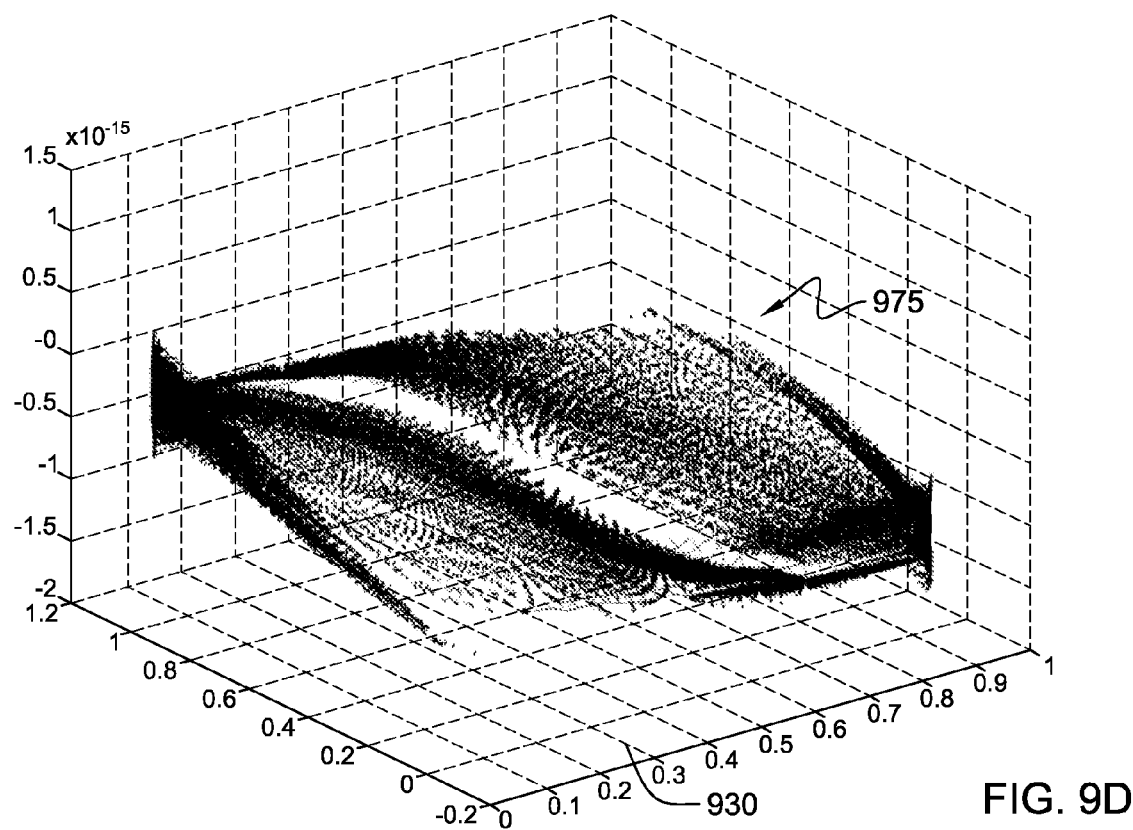
FIG. 9D shows an example graph of output data generated by performing a merge of both—the rising and falling models using the average of the difference in the common area of interest in [Vi×Vo] space.

FIG. 9D shows an example graph of output data generated by performing a merge of both—the rising and falling models using the average of the difference in the common area of interest in [Vi×Vo] space. FIG. 9D particularly shows filtered and interpolated values 975 of charge on Grid(Vi×Vo) 930, i.e., the smoothened charge values on the example Grid(Vi× Vo), e.g., Grid(38×38) showing points for the leveled output data obtained from using the average of the difference between the rising and falling charge values in the common area of interest for the example inverter model. Thus, for the case of the inverter circuit (cell model), as the rising and falling regions occupy different areas of the total [Vi×Vo] space, the merged charge values 975 obtained on the grid provide improved accurate performance when modeling noisy waveforms compared to either extrapolated rising output charge values or extrapolated falling output charge values alone.

Once the charge model is obtained, the charge model may then be tested for its accuracy by developing a methodology to compute an error metric between the output waveforms generated by the actual digital cell, e.g., inverter, in SPICE and the ones generated by the charge-based model, e.g., of the inverter.

Figure 10:
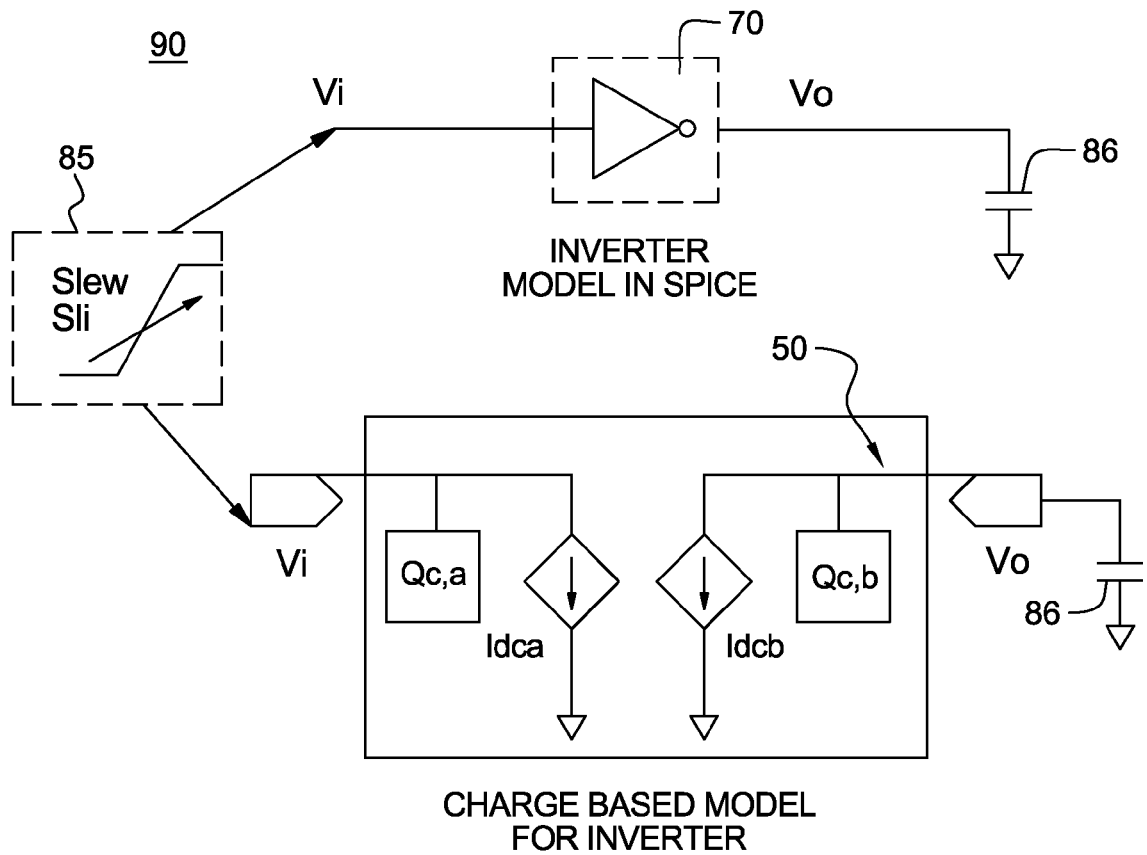
FIG. 10 depicts a methodology 90 for developing and computing an error metric, where, for a fixed output capacitance, various slews (rising/falling) are applied to a digital cell model in one embodiment.

FIG. 10 depicts a methodology 90 for developing and computing an error metric. For a fixed output capacitance 86, various slews 85 (rising/falling) are applied to a digital cell model, e.g., inverter circuit model 70, as provided in a simulator tool, e.g., SPICE, and to the charge based model for the digital cell, e.g., example inverter 50 of FIG. 6. The output waveforms generated from both SPICE and charge based model are stored at fixed time points. These are then compared for accuracy in a software based error calculating engine.

Figure 11:
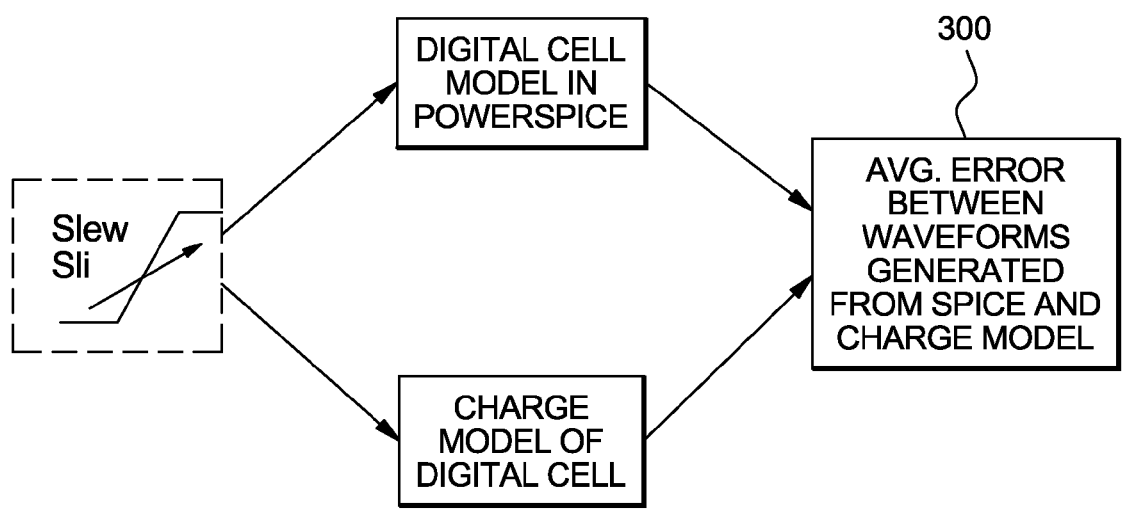
FIG. 11 depicts use of an error calculating software engine 300 developed to calculate the average error between the output waveforms generated by a circuit simulator program, e.g., POWERSPICE, and the extracted charge model for a digital cell.

FIG. 11 depicts use of an error calculating software engine 300 developed to calculate the average error between the output waveforms generated by POWERSPICE and the extracted charge model for a digital cell, e.g., the inverter cell 50. In one embodiment, the average value of error between the output waveforms is resulted on an absolute scale, i.e., neglecting the signs of the error values and taking the average of the modulus of the actual error values. An error is computed for the delay and the slew values of the output waveforms from the charge based model as compared to the SPICE by engine 300. The value of error percentage (e.g., on absolute scale) between the output waveforms actually provides an upper bound to the errors in delay and slew.

In one aspect, the value of average error between two waveforms 'Vspice' and 'Vcharge' for 'N' points of both the waveforms (for a value of input slew='sl') is computed as:

$$\text{error}[sl] = \sum_{i=1}^{N} \{|Vspice[i] - Vcharge[i]| / |Vspice[i]|\} / N$$

The average error for a particular load capacitance for all the slews applied is given by:

$$\text{Error\_Avg}| Cl = \sum_{sl=SLEW|min}^{SLEW|max} \text{error}[sl] / K$$

where N=number of points where |(Vspice[i]−Vcharge[i]) |>0 for all 'i' and K=number of slews for which the experiments are performed. The average value of error as computed by equation above provides an upper bound for the average value of errors in delay and slews of the output waveforms. Hence, it is used as an efficient metric to judge the accuracy.

Preliminary experiments on simple cells, e.g., 45 nm CMOS based standard cell technology library, show less than 2% error in the output waveforms compared to the SPICE. For extracting the charge model, first a DC analysis is run in SPICE to characterize the DC current sources at input and output of the inverter. The charges at input and output of the inverter are then characterized using the methodology shown in the flowchart in FIG. 5.

Figure 12:
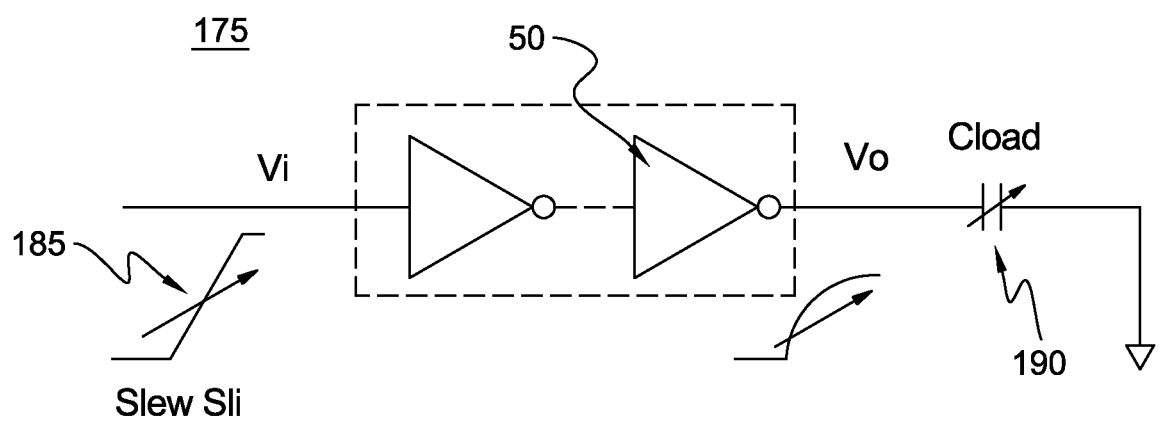
FIG. 12 depicts a charge characterization model of a buffer cell that may include a circuit including two or more stages, having up to N inverters in series connection in one embodiment; and, FIG. 13 illustrates an exemplary hardware configuration for implementing the overall charge characterization methodology for any digital cell according to one embodiment.

FIG. 12 depicts a charge characterization of a buffer cell 175 which can be a circuit including two or more stages, having up to N inverters in series connection.

In general, any node, e.g., a middle node (or any other internal node) can be included for the characterization process and this helps increase the accuracy of characterization as the value of charge at any port depends not only upon the cell's port voltages, but also upon the voltages at internal nodes.

As in the inverter cell case, the buffer cell 175 is characterized as loaded with an output capacitance 'Cload' 190 and provided with a rising input ramp of slew 'Sli' 185. For this arrangement, by sampling the voltage waveforms at input and output of each buffer stage at fixed time points, a number of combinations of [Vi, Vo] is obtained for a particular slew 'Sli' and output loading capacitance 'Cload'. Denoting the set of all the possible [Vi Vo] combinations as [Vi×Vo] space, by varying the slew 'Sli' 185 from its minimum to maximum range for every possible output load capacitance 190, then all the permissible [Vi, Vo] combinations would be achieved for the buffer model 175 shown in FIG. 12. The entire collection of all such permissible [ViVo] combinations are obtained and can be processed in the manner as described for the inverter model, including the computations performed for characterizing rising and falling input slews, the filtering, extrapolating, identifying of rising and falling charge in a common region, and the merging of charge data values in the manner as described herein.

The techniques and methods for characterizing the non-linear charge at output ports of digital circuit devices, as described herein with respect to FIG. 5, are applicable for modeling all for all cells, e.g., digital circuits including but not limited to: single/multiple input gates such NAND, NOR, AND, OR, NOT, etc.

Figure 13:
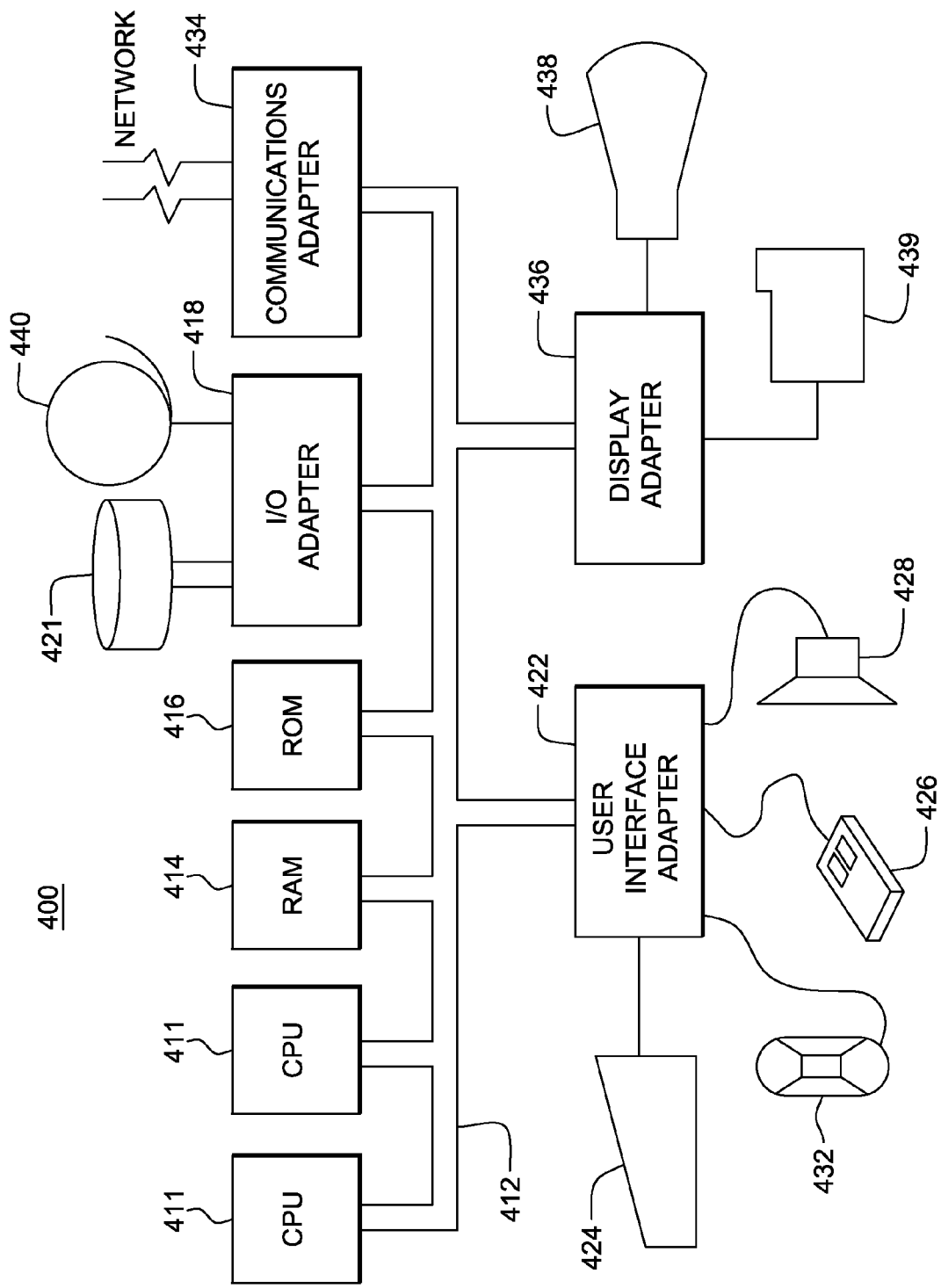

FIG. 13 illustrates an exemplary hardware configuration of a computing system 400 running and/or implementing the method steps described herein with respect to FIG. 5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations (e.g., FIG. 5) and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method of modeling a digital circuit having at least one nonlinear charge source at an input port or output port of the circuit, said method comprising:
   performing a simulation of the circuit by iteratively applying input ramp voltage waveforms on a circuit input port 'A' at a different capacitive output load (Cload) at an output port 'B' at each iteration, wherein at each iteration, said input ramp voltage waveform is swept at different voltage slew rates;
   determining, at successive time steps of each iteration, a voltage value Vi on said input port 'A', a voltage value Vo on the output port 'B', and current values (ia) and (ib) on the input port 'A' and output port 'B' respectively, at each capacitive output load;
   computing, from the current values (ia) and (ib), for each successive time step of each said iteration, at least one charge value for an input charge source (Qa(Vi,Vo)) at input port 'A' and at least one charge value for an output charge source (Qb(Vi,Vo)) at output port 'B' as a function of Vi and Vo voltage values, said at least one charge value for an input charge source or output charge source being computed based on a combination of Vi and Vo voltage values; and
   generating an input or output nonlinear charge source from the at least one charge value, said input or output nonlinear charge sources used in modeling a dynamic behavior of said digital circuit.

2. The method of claim 1, further comprising: determining at least one voltage-dependent DC current source Idca(Vi, Vo), Idcb(Vi, Vo) at a respective input port 'A' or output port 'B' of the circuit, wherein the at least one charge value Qa(Vi, Vo) is a function of: an accumulation of charge based on a current value (ia), at the input port ('A') minus an accumulation of charge based on said DC current source (Idca(Vi, Vo)) at the input port ('A'), and
   the at least one charge value ((Qb(Vi,Vo)) is a function of: an accumulation of charge based on a current value (ib), at the output port ('B') minus an accumulation of charge based on said DC current source Idcb(Vi, Vo)) at the output port ('B').

3. The method of claim 2, wherein the computing of at least one charge value Qa(Vi,Vo) and Qb(Vi,Vo) is governed according to:

$$Qb(Vi,Vo)=\int ib*dt-\int Idcb(Vi,Vo)*dt$$

$$Qa(Vi,Vo)=\int ia*dt-\int Idca(Vi,Vo)*dt.$$

4. The method of claim 1, wherein a set of all possible combinations of Vi and Vo voltage values determined for applied different input ramp voltage slew rates at each said different capacitive output load defines a [Vi×Vo] cell space, said charge values Qa (Vi,Vo) and Qb(Vi,Vo) are computed dynamically at each successive time step at each said iteration for every voltage input and voltage output combination defined within said [Vi×Vo] cell space.

5. The method of claim 4, wherein said charge values Qa (Vi,Vo) and Qb(Vi,Vo) each comprises a plurality of charge values Q(Vi, Vo), said method further comprising:
   filtering the plurality of charge values Q(Vi,Vo) values to create a continuous charge value function.

6. The method of claim 5, wherein said applying a ramp at a different voltage slew rate includes:
   applying a rising voltage input ramp signal at the input port and generating first charge values of the plurality of charge Q(Vi,Vo) values, and,
   applying a falling voltage input ramp signal at the input port and generating second charge values of the plurality of charge Q(Vi,Vo) values.

7. The method of claim 5, wherein said filtering further comprises:
   extending said continuous charge value function to include charge Q(Vi,Vo) values outside a range of input and output port voltages obtained in the performed simulation.

8. The method of claim 6, wherein said filtering further comprises:
   identifying of rising and falling charge Q(Vi,Vo) values in a common region of input voltage and voltage output combinations in said [Vi×Vo] cell space, and,
   merging of said rising and falling charge Q(Vi,Vo) values in said common region.

9. The method of claim 1, wherein said input ramp voltage waveforms at the circuit input port are swept between a min-max voltage range at each input voltage slew rate, wherein after applying said input ramp voltage waveforms, said simulation further comprises:
   determining if a current Cload value is less than a maximum Cload (Cload_max) value; and, if the determining result is less than said Cload_max,
   incrementing the Cload;
   repeating the applying of said input ramp voltage waveforms at the circuit input port at various Slew rates and measuring, at each successive time step, the current values at the cell input ports and output port, and storing each said output/input current values for each [Vi Vo] at each incremented Cload value, while said Cload<Cload_max.

10. A system for modeling a digital circuit having at least one nonlinear charge source at an input port or output port of the circuit, said system comprising:
   a memory;
   a processor unit in communication with said memory, for performing a method comprising:
   performing a simulation of the circuit by iteratively applying input ramp voltage waveforms on a circuit input port 'A' at a different capacitive output load (Cload) at an output port 'B' at each iteration, wherein at each iteration, said input ramp voltage waveform is swept at different voltage slew rates;
   determining, at successive time steps of each iteration, a voltage value Vi on said input port 'A', a voltage value Vo on the output port 'B', and current values (ia) and (ib) on the input port 'A' and output port 'B' respectively, at each capacitive output load;

computing, from the current values (ia) and (ib), for each successive time step of each said iteration, at least one charge value for an input charge source (Qa(Vi, Vo)) at input port 'A' and at least one charge value for an output charge source (Qb(Vi, Vo)) at output port 'B' as a function of Vi and Vo voltage values, said at least one charge value for an input charge source or output charge source being computed based on a combination of Vi and Vo voltage values; and, generating an input or output nonlinear charge source from the at least one charge value, said input or output nonlinear charge sources used in modeling a dynamic behavior of said circuit.

11. The system as claimed in claim 10, wherein said processor unit is further configured to:

determine at least one voltage-dependent DC current source Idca(Vi, Vo), Idcb(Vi, Vo) at a respective input port 'A' or output port 'B of the circuit', wherein the at least one charge value Qa(Vi,Vo) is a function of:

an accumulation of charge based on a current value (ia) at the input port minus an accumulation of charge based on said DC current source Idcb(Vi, Vo) at the output port; and, the at least one charge value ((Qb(Vi,Vo)) is a function of:
an accumulation of charge based on a current value (ib), at the output port ('B') minus an accumulation of charge based on said DC current source Idcb(Vi, Vo) at the output port ('B').

12. The system as claimed in claim 11, wherein the computing of at least one charge value Qa(Vi,Vo) and Qb(Vi,Vo) is governed according to:

$$Qb(Vi,Vo)=\int ib*dt - \int Idcb(Vi,Vo)*dt$$

$$Qa(Vi,Vo)=\int ia*dt - \int Idca(Vi,Vo)*dt.$$

13. The system as claimed in claim 10, wherein a set of all possible combinations of Vi and Vo voltage values determined for applied different input ramp voltage slew rates at each said different capacitive output load defines a [Vi×Vo] cell space, said processor unit is further configured to:

dynamically compute said charge value Qa(Vi,Vo) and Qb(Vi, Vo) at each successive time step at each said iteration for every voltage input and voltage output combination defined within said [Vi×Vo] cell space.

14. The system as claimed in claim 13, wherein each charge value Qa(Vi,Vo) and Qb(Vi,Vo) comprises a plurality of charge values Q(Vi, Vo), said processor unit is further configured to:

filter the plurality of charge values Q(Vi,Vo) values to create a continuous charge value function.

15. The system as claimed in claim 14, comprising:

means for applying said rising voltage input ramp waveforms at the input port and generating first charge values of the plurality of charge Q(Vi, Vo) values, and, means for applying said falling voltage input ramp waveforms at the input port and generating second charge values of the plurality of charge Q(Vi, Vo) values.

16. The system as claimed in claim 14, wherein said processor unit is further configured to:

extend said continuous charge value function to include charge Q(Vi,Vo) values outside a range of input and output port voltages obtained in the performed simulation.

17. The system as claimed in claim 15, wherein said processor unit is further configured to:

identify rising and falling charge Q(Vi, Vo) values in a common region of input voltage and voltage output combinations in said [Vi×Vo] cell space, and, merge said rising and falling charge Q(Vi,Vo) data values in said common region.

18. The system as claimed in claim 10, wherein said input ramp voltage waveforms at the circuit input port are swept between a min-max voltage range at each input voltage slew rate, wherein after applying said input ramp voltage waveforms, said processor unit further configured to:

determine if a current Cload value is less than a maximum Cload (Cload_max) value; and, if the determining result is less than said Cload_max, increment the Cload; and, repeat the applying of said input ramp voltage waveforms at the circuit input port at various Slew rates and measure, at each successive time step, the current values at the cell input port and output port, and storing each said output/input current values for each [Vi Vo] at each incremented Cload value, while said Cload<Cload_max.

19. A computer program product for modeling a digital circuit having at least one nonlinear charge source at an input port or output port of the circuit, the computer program product comprising:

a non-transitory storage medium readable by a processing circuit and storing instructions for execution by the processing circuit for performing a method comprising:

performing a simulation of the circuit by iteratively applying input ramp voltage waveforms on a circuit input port 'A', at a different capacitive output load (Cload) at an output port 'B' at each iteration, wherein at each iteration, said input ramp voltage waveform is swept at different voltage slew rates;

determining, at successive time steps of each iteration, a voltage value Vi on said input port 'A', a voltage value Vo on the output port 'B', and a current values (ia) and (ib) on the input port 'A' and output port 'B' respectively, at each capacitive output load;

computing, from the current values (ia) and (ib), for each successive time step of each said iteration, at least one charge value for an input charge source ((Qa(Vi, Vo)) at input port 'A' and at least one charge value for an output charge source (Qb(Vi, Vo))) at output port 'B' as a function of Vi and Vo voltage values, said at least one charge value for an input charge source or output charge source being computed based on a combination of Vi and Vo voltage values; and generating an input or output nonlinear charge source from the at least one charge values, said input or output nonlinear charge sources used in modeling a dynamic behavior of said circuit.

20. The computer program product as claimed in claim 19, wherein said method further comprises:

determining at least one voltage-dependent DC current source Idca(Vi, Vo), Idcb(Vi, Vo) at a respective input port 'A' or output port 'B of the circuit', wherein the at least one charge value Qa(Vi,Vo) is a function of:

an accumulation of charge based on a current value (ia) at the input port minus an accumulation of charge based on said DC current source Idcb(Vi, Vo) at the output port; and, the at least one charge value ((Qb(Vi,Vo)) is a function of:
an accumulation of charge based on a current value (ib), at the output port ('B') minus an accumulation of charge based on said DC current source Idcb(Vi, Vo) at the output port ('B').

21. The computer program product as claimed in claim 19, wherein a set of all possible combinations of Vi and Vo voltage values determined for applied different input ramp voltage slew rates at each said different capacitive output load defines a [Vi×Vo] cell space, said charge values Qa(Vi,Vo) and Qb(Vi,Vo) are computed dynamically at each successive time step for every voltage input and voltage output combination defined within said [Vi×Vo] cell space.

22. The computer program product as claimed in claim 21, wherein each charge value Qa(Vi,Vo) and Qb(Vi,Vo) comprises a plurality of values Q(Vi,Vo), said method further comprising:
  filtering the plurality of charge values Q(Vi,Vo) to create a continuous charge value function.

23. The computer program product as claimed in claim 22, wherein said applying a ramp at a different voltage slew rate includes:
  applying a rising voltage input ramp signal at the input port and generating first charge values of the plurality of charge Q(Vi,Vo) values, and,
  applying a falling voltage input ramp signal at the input port and generating second charge values of the plurality of charge Q(Vi,Vo) values.

24. The computer program product as claimed in claim 22, wherein said filtering further comprises:
  extending said continuous charge value function to include charge Q(Vi,Vo) values outside a range of input and output port voltages obtained in the performed simulation.

25. The computer program product as claimed in claim 23, wherein said filtering further comprises:
  identifying of rising and falling charge Q(Vi,Vo) values in a common region of input voltage and voltage output combinations in said [Vi×Vo] cell space, and,
  merging of said rising and falling charge Q(Vi,Vo) values in said common region.

* * * * *